Figure 1:
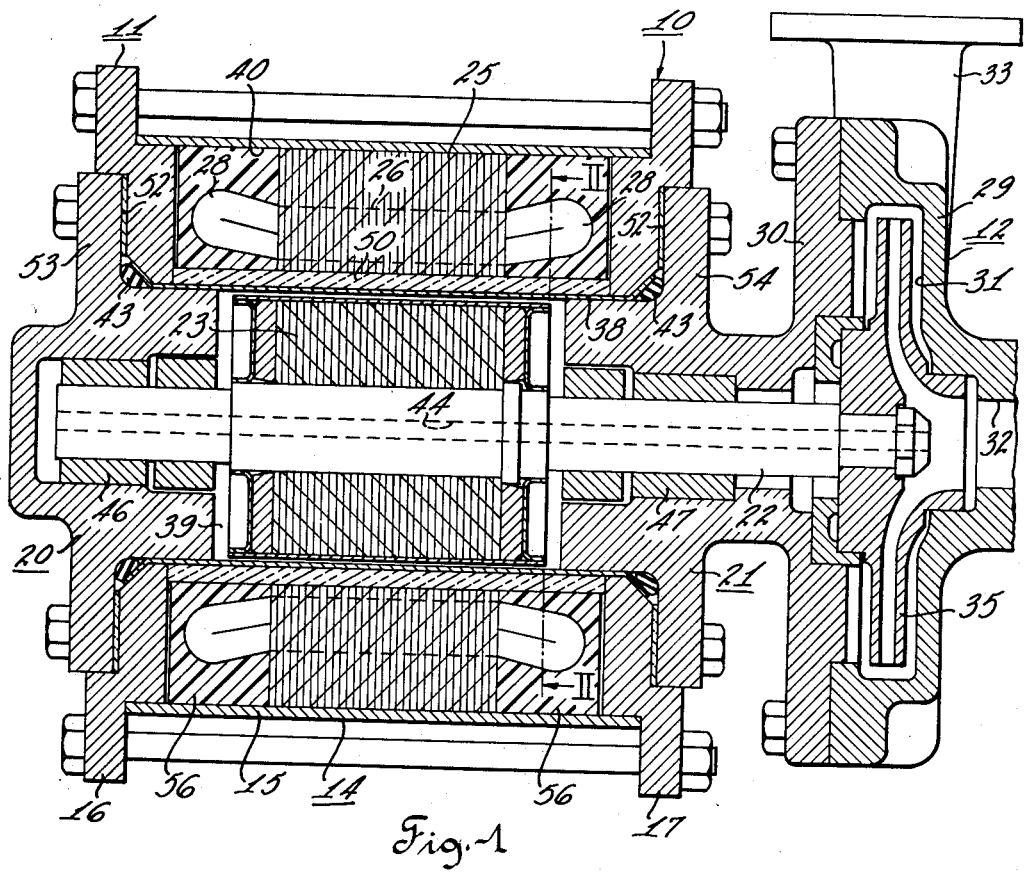

July 6, 1965  J. E. HAEGH  3,192,861
HIGH TEMPERATURE CANNED MOTOR PUMP
Filed March 6, 1963

Inventor
Jan E. Haegh
By Robert B. Benson
Attorney

United States Patent Office 3,192,861
Patented July 6, 1965

3,192,861
HIGH TEMPERATURE CANNED MOTOR PUMP
Jan E. Haegh, Cincinnati, Ohio, assignor to Allis-Chalmers Manufacturing Company, Milwaukee, Wis.
Filed Mar. 6, 1963, Ser. No. 263,290
3 Claims. (Cl. 103—87)

This invention relates generally to electric motors. More specifically, this invention relates to canned motors used to drive pumps for high temperature liquids.

More and more applications are being found in which extremely high temperature materials such as heat transfer fluids and molten metals are transported from one place to another by means of a centrifugal pump. In many of these applications, the material being pumped is of such a nature that no leakage from the pumping system can be tolerated. For example, such liquids may be toxic, explosive or a precious material. The so-called sealless or canned motor pump units that eliminate the conventional seal or stuffing box between the motor and pump are frequently used in this application. In the canned motor pump unit, a cylindrical can is used to hydraulically separate the stator assembly from the rotor chamber, and part of the liquid being pumped flows inwardly along the shaft into the rotor chamber and around the rotor and bearings of the motor. Some of the heat from the material flowing through the rotor chamber is transmitted through the can to the stator core and windings and then out to atmosphere. As the temperatures of the materials being pumped become higher and higher, more heat is dissipated through the stator core and windings. In many cases, the stator winding is heated to a temperature that exceeds the recommended operating temperature of the insulation of the stator windings. This causes premature breakdown of the insulation and failure of the motor. As a result, high class insulation is often required for these motors, plus a special cooling system for keeping the temperature of the stator windings below the acceptable operating temperatures for the insulation used.

The canned motor of this invention overcomes the problem mentioned above by providing a special thermal insulating member between the outside diameter of the can surrounding the rotor and the inside diameter of the stator which retards the heat transfer from the rotor chamber to the stator and thereby allows the stator to operate at much cooler temperatures. This makes it possible to use a stator having conventional insulation presently available on the market without the requirement of special additional cooling means for the stator.

Therefore, it is the object of this invention to provide a new and improved canned electric motor.

Another object of this invention is to provide a new and improved canner motor pump for high temperature liquids.

Another object of this invention is to provide new and improved motor pump units with means for retarding the heat transfer from the liquid being pumped to the stator winding of the motor.

Figure 2:
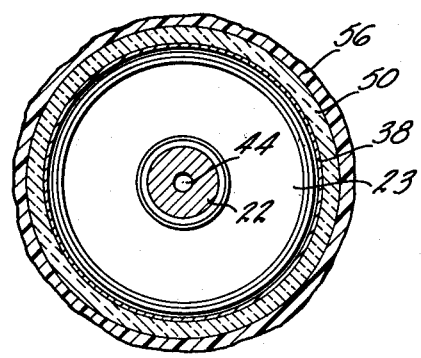

Other objects and advantages of this invention will be apparent from the following description when read in connection with the accompanying drawing in which:

FIG. 1 is a cross sectional view of a motor pump unit embodying this invention; and FIG. 2 is a cross sectional view taken along the lines II—II of FIG. 1.

Referring more particularly to the drawing by characters of reference, the invention is illustrated in a motor pump unit 10 comprising a canned motor 11 connected to a centrifugal pump 12. The casing 14 forming the motor chamber consists generally of an annular yoke 15, a pair of end housings 16, 17 having bearing housings 20, 21 mounted therein for journaling the shaft 22. An annular stator assembly 25 is mounted within the yoke 15 and surrounds a rotor 23 which is mounted on the shaft 22 for rotation therewith. The stator assembly comprises a core having a suitable winding 26 positioned in winding slots in the core with the winding end turns 28 extending beyond the core at both ends. The winding has suitable leads for connection to a source of alternating current.

The centrifugal pump casing 29 is connected to an outwardly extending flange 30 on the inboard bearing housing 21 and defines therebetween a pumping chamber 31 having an axial inlet 32 and a radially spaced discharge 33. An impeller 35 is mounted on the shaft 22 for rotation therewith and is positioned within the pumping chamber 31 opposite the pump inlet 32.

A cylindrical can 38 of suitable material is mounted between the bearing housings 20, 21 and the motor end housings 16, 17, respectively, and extends through the motor chamber to divide the interior of the motor casing into separate rotor and stator chambers 39, 40. The can 38, hereinafter called the stator can, is positioned in the air gap of the motor and is provided with suitable sealing means 43 at each end to hydraulically separate the stator chamber 40 from the rotor chamber 39. Hence, some of the liquid being pumped can flow along the shaft 22 into the rotor chamber and back through the passageway 44 in the shaft 22 to the inlet 32 of the pump without leaking to atmosphere or into the stator chamber. The liquid flowing into the rotor chamber also flows around the bearings 46, 47 to lubricate them.

Although the elements of the rotor 23 usually have a greater resistance than the stator elements to the deleterious effect of the liquid being pumped, the rotor may also be canned as shown at 50 in FIG. 1. The material used to can the rotor is usually the same as the can separating the rotor and stator.

Since the pump of this invention is intended for use in pumping liquids having a temperature between 450° F. and 700° F., a great deal of heat would normally be transferred from the rotor chamber to the stator through the stator can 38. However, in the motor of this invention, a suitable thermal insulating material 50 is positioned between the rotor and stator chambers to reduce the amount of heat transferred from the rotor chamber to the stator. This permits the use of conventional insulation on the stator windings without requiring an additional supplementary cooling system for the stator. For example, a conventional natural or forced convection cooling will be sufficient in most applications using the thermal insulation system of this invention. On the other hand, the heat retained in the rotor chamber helps to maintain the fluid being pumped above the temperature at which it will solidify.

As best shown in FIG. 2, the outer surface of the stator can is wrapped with a layer of insulating material 50 having a very low coefficient of heat transfer. This material retards the transfer of heat from the rotor chamber to the stator through the can. As shown in the drawing, a layer of asbestos mat 50 is formed around the stator can 38. However, any suitable material having a low coefficient of heat transfer could be used. Some ceramics such as low density, plasma (Flame) sprayed $Al_2O_3$ and $Cr_2O_3$ have a low coefficient of heat transfer and are suitable for use in the motor of this invention. These ceramics can be sprayed on the outer surface of the can 38 to form the required layer of thermal insulation.

To promote dissipation of self-generated heat from the stator core and end turns, the core 25 is press fitted into a yoke 15 of a material with a high coefficient of heat transfer. The end turn cavities may be potted with a heat resistant compound 56 such as Sylgard 191 to provide a low thermal resistance between the end turns 28 and the yoke. To further aid the dissipation of heat from the motor casing, the yoke and outboard bearing housing can be provided with suitable fins or other means to increase the amount of surface area exposed to the cooling medium flowing over the motor casing.

It has been established that highly filled potting compounds such as the Sylgard 191 in addition to promoting heat transfer from the end turns to the yoke, will provide adequate radical can support and prevent distortion of the can due to high pressures within the rotor chamber.

To further protect the stator windings from the heat transmitted by the noninsulated structural members, thermal insulators 52 may be positioned between the radial flanges 53, 54 on the bearing housings 20, 21 and the end housings 16, 17. This material can also serve the function of a gasket.

Although but one embodiment has been illustrated and described, it will be apparent to those skilled in the art that various modifications and changes can be made therein without departing from the spirit of the invention or from the scope of the appended claims.

Having now particularly described and ascertained the nature of my said invention and the manner in which it is to be performed, I declare that what I claim is:

1. An electric motor comprising: an annular yoke, a pair of motor end housings connected to said yoke, bearing housings mounted in said end housings, a thin cylindrical can positioned between said bearing housings and said motor end housings to define said housings and yoke hydraulically separated rotor and stator chambers, an annular motor stator assembly mounted within said stator chamber, a shaft rotatably mounted in said bearing housings, a motor rotor mounted on said shaft and positioned in said rotor chamber within the bore of said stator assembly, and a layer of thermal insulating material surrounding said can to reduce the rate of heat transfer between said rotor chamber and said stator, said yoke and said end housings being made of a material having a higher coefficient of heat transfer than said thermal insulating material to increase the dissipation of heat from said stator chamber.

2. An electric motor comprising: an annular yoke, a pair of motor end housings connected to said yoke, a pair of bearing housings mounted in said end housings, a thin cylindrical can positioned between said bearing and motor end housings to define said housings and yoke hydraulically separated rotor and stator chambers, an annular motor stator assembly mounted within said stator chamber, said stator assembly comprising a laminated iron core having arcuately spaced slots formed therein, a winding positioned in said slots and extending axially beyond said core at both ends, a shaft rotatably mounted in said bearing housings, a motor rotor mounted on said shaft and positioned in said chamber within the bore of said stator assembly, and a layer of thermal insulating material surrounding said can to reduce the rate of heat transfer between said rotor chamber and said stator, said extensions of said windings being encapsulated in a material having a higher coefficient at heat transfer than said thermal insulating material, said encapsulating material being in contact with said yoke to increase the transfer of heat from said windings to atmosphere through said yoke.

3. An electric motor pump unit comprising: a motor casing having an annular yoke and axially spaced end housing, bearing housings mounted in said end housings, and forming with said yoke and end housings a motor chamber, a pump casing connected to said motor casing and defining an impeller chamber therein, a shaft rotatably mounted in said bearing housings and extending into said rotor chamber, a thin cylindrical can positioned between said bearing housings and said motor end housings and extending through said motor chamber to hydraulically separate said motor chamber into a rotor chamber and a stator chamber, a stator assembly mounted within said stator chamber, a rotor mounted on said shaft and positioned within said rotor chamber, a pump impeller mounted on said portion of said shaft extending into said impeller chamber, a layer of thermal insulating material surrounding said can to reduce the rate of heat transfer between said rotor chamber and said stator chamber and a layer of thermal insulating material positioned between said motor end housings and said bearing housings.

References Cited by the Examiner
UNITED STATES PATENTS

| | | | |
|---|---|---|---|
| 1,678,380 | 7/28 | Cooper | 310—86 |
| 1,861,036 | 5/32 | Thordarson | 310—86 |
| 1,930,797 | 10/33 | Gold et al. | 310—86 |
| 2,463,936 | 3/49 | Allison | 310—86 |
| 2,673,028 | 3/54 | Cornelius et al. | 230—211 X |
| 2,967,960 | 1/61 | Waldschmidt | 310—86 |

ROBERT M. WALKER, *Primary Examiner.*

LAURENCE V. EFNER, *Examiner.*